United States Patent [19]
Maeda et al.

[11] Patent Number: 5,295,449
[45] Date of Patent: Mar. 22, 1994

[54] DRY DISTILLATION GASIFICATION COMBUSTION EQUIPMENT, DRY DISTILLATION GAS GENERATOR, AND COMBUSTION GAS BURNER UNIT

[75] Inventors: Naomi Maeda, Sakata; Seiichirou Sasahara, Yamagata, both of Japan

[73] Assignee: Emu Dee-Aru Co., Ltd., Sakata, Japan

[21] Appl. No.: 931,274

[22] Filed: Aug. 17, 1992

[51] Int. Cl.⁵ ............................................. F23G 5/12
[52] U.S. Cl. ................................. 110/229; 48/69; 48/111; 110/242; 110/248; 431/352
[58] Field of Search ............... 110/229, 346, 298, 300, 110/242, 248; 431/342, 343, 351, 352, 5; 48/61, 89, 111

[56] References Cited
U.S. PATENT DOCUMENTS

| | | | |
|---|---|---|---|
| 4,687,436 | 8/1987 | Shigeta | 431/352 X |
| 4,841,884 | 6/1989 | Engstrom et al. | 110/298 X |
| 5,101,739 | 4/1992 | Nance et al. | 110/229 |

FOREIGN PATENT DOCUMENTS

| | | |
|---|---|---|
| 45-4469 | 2/1970 | Japan . |
| 56-4709 | 8/1981 | Japan . |
| 60-122631 | 8/1981 | Japan . |

*Primary Examiner*—Edward G. Favors
*Attorney, Agent, or Firm*—Thomas R. Morrison

[57] ABSTRACT

A dry distillation gas generator generates a dry distillation gas for burning in a separate combustion gas burner unit. Air is supplied in a gentle decelerated flow to the bottom of the dry distillation generator in a quantity sufficient to support combustion of a solid fuel in the vicinity of the air supply, but at a low enough volume to prevent the combustion proceeding to other parts of the generator, thus thermally decomposing the remainder of the solid fuel to generate the dry distillate gas. An air chamber surrounds the generator to reduce the temperature to which the solid fuel is exposed. Similarly, an air chamber is disposed below the bottom of the generator to supply air to the generator, and to moderate the temperature therein. An impurity separation tank in a conduit between the generator and the gas burner unit helps prevent particulates from entering the generator. A preheat burner in the combustion gas burner unit includes a pilot to ignite and preheat the gas. A first air injection device injects air from outside the gas burner in a spiral flow to agitate and mix the gas with air. A second air injection device injects air preheated in an air storage layer surrounding the gas burner unit into the gas burner in a spiral flow to further agitate and mix the gas with air. The injection point of the second air injection device is downstream of the injection point of the first air injection device.

17 Claims, 6 Drawing Sheets

DRY DISTILLATION GASIFICATION COMBUSTION EQUIPMENT, DRY DISTILLATION GAS GENERATOR, AND COMBUSTION GAS BURNER UNIT

TECHNICAL FIELD

This invention relates to a dry distillation gas generator adapted for heating a solid fuel, e.g., a high molecular material such as rubber or plastic, etc., or tire, etc. to convert the solid fuel to a combustible gas by heat decomposition, a dry distillation gasification combustion equipment in which a combustion burner unit for burning a generated dry distillation gas is combined with the dry distillation gas generator, and a combustion burner unit most suitable for use in the dry distillation gasification combustion equipment.

BACKGROUND ART

A solid fuel combustion equipment with an upward combustion system is disclosed in Japanese Laid Open Patent Application No. 231307/1984, in which a combustion unit provided on a distillation unit for converting a solid fuel to a distillation gas. A heat exchange unit at the upper part thereof to generate a distillation gas at the lower part thereof and to burn this gas as it rises through the heat exchange unit. An air supply means delivers a small quantity of air at the bottom portion of the distillation unit. It is seen from the figure that an upward air-supply opening is bored at the bottom portion thereof.

While it can be said that the above-described equipment is, in principle, a sort of dry distillation gasification combustion equipment, it is only a structure in which the dry distillation unit and the combustion unit are continuous in upper and lower directions It is not of a structure in which both units are clearly partitioned.

When attention is drawn to the dry distillation unit of this equipment, insufficient consideration is given to generation efficiency of the dry distillation gas and to making the dry distillation gasification process as clean as possible. Therefore, environmental problems such as the generation of soot and smoke or dust, or odor remained unsolved.

The few bored air supply holes bored in the bottom of this unit tend to become choked or clogged up with ashes from the combustion taking place therein. Consequently, unstable performance of the apparatus reduces the production efficiency of the dry distillation gas, or stoppage of production of the distillation occurs.

To continue operation, an operator must clean out the small air supply holes by inserting a driver, or the like, into individual holes to scrape away ashes therefrom. This is tedious work, and its necessity substantially reduces the effectiveness of the equipment.

As stated above, the conventional equipment is unsatisfactory in its efficiency in the production of dry distillation gas, the generation of clean dry distillation gas, and in its performance stability. In addition, the difficulty in cleaning and maintenance are substantial drawbacks.

Further the combustion unit of this prior-art unit burns dry distillation gas only within a broad combustion chamber wherein dry distillation gas is mixed with air together with soot and smoke or dust, etc. Accordingly, it is impossible to adjust combustion to attain complete, clean, combustion.

A gasification fuel combustion equipment for burning gasified fuel obtained by means such as dry distillation, etc. is disclosed in Japanese Patent Publication No. 29365/1990. This equipment is common to the equipment of the invention of this application in the sense that combustion equipment of the burner system is adapted for completely burning a fuel once gasified by dry distillation or other means.

However, since this prior art uses a rectification cylinder within a cylindrical combustion chamber, thus to agitate and mix air blown off from small holes with combustion gas, this equipment is satisfactory at the beginning of use, but such holes become clogged after a little use. Further, the internal structure is complicated, and its cleaning and/or maintenance are very difficult.

OBJECTS AND SUMMARY OF THE INVENTION

It is an object of the invention to provide a dry distillation gasification combustion equipment, dry distillation gas generator, and combustion gas burner unit which overcome the drawbacks of the prior art.

It is a further object of the invention to provide a system which offers efficient generation of dry combustion gas from a high-molecularweight fuel, and in which combustion is controllable to provide a clean effluent.

It is a still further object of the invention to provide a dry distillation gas generator and a combustion gas burner which has high performance, is easy to handle, and has high utility.

It is a still further object of the invention to provide a combustion gas burner for use with a dry distillate gas generator according to the invention or with a conventional dry distillation gasification combustion equipment that provides complete stable combustion with a clean, environmentally acceptable exhaust.

Studies on the technical problems to be solved by the present invention are as follows. First, the technical problem of the combustion burner unit will be described. Since the combustion burner unit is exposed to high temperature at all times, it can become damaged, and permit burning materials to be ejected, or to become attached thereto. For this reason, frequent maintenance of this type of equipment is expected. Accordingly, the present invention provides a combustion burner unit having a burner with a simple internal structure having few, if any, uneven portions, so that cleaning is simplified.

To resist the high temperatures of combustion, the cylindrical burner body of the combustion burner unit of the present invention, the burner body is made of materials having excellent heat resisting properties.

In order to realize complete combustion, the combustion burner unit provides excellent agitation and mixture of fuel with air to improve the combustion speed and/or efficiency.

The technical problem of the dry distillation gas generator will now be described. In order to burn and heat a solid fuel, e.g., high molecular material such as rubber or plastic, or tires, etc., within a dry distillation gas generator, in a manner effect to produce a dry distillation gasified fuel by thermal decomposition, the oxygen supply for combustion must be controlled to a value low enough to allow a limited weak combustion state to last for a long time, but high enough to burn a sufficient portion of the solid fuel to thermally decompose the remainder. This requires that the amount combustion heat should be sufficient to allow only a portion of solid fuel to burn weakly over a long time, while the combustion heat decomposes the remainder of the solid fuel to a gaseous fuel.

However, it is a difficult technical problem to maintain and control the dry distillation conditions through control of the combustion heating system to generate a stable supply of clean combustible gas from a solid fuel such as tires. In the prior art, satisfactory combustible gas was not achievable.

In actual terms, it is first pointed out that controlling the air supply to maintain distillation condition in which combustion and heating are well-balanced is technically difficult.

Secondly, it is difficult to deliver air in a gentle even manner to reduce expulsion of soot and dust such as carbon, etc. and thereby produce clean combustible gas in a stable manner.

Thirdly, many solid fuels such as, for example, tires, contain impurities which, when burned and heated, produce byproduct impurities such as tar, carbon, wire, spike tire pins or sand. These byproduct impurities can melt together to produce solid waste, be reduced to ashes, or otherwise result in unburned residual material. Such residual material can clog air blowoff openings. Such clogging destabilizes the supply of air, thus making it difficult to maintain stable combustion in which the conditions for dry distillation condition are satisfied.

Fourthly, it is difficult to find an easy way to eliminate residual impurities within a dry distillation gas generator to simplify cleaning thereof, thus to prevent lowering of the distillation gas generation long-term efficiency.

This invention contemplates solving the technical problems as described above.

The technical problem of the invention concerning the dry distillation gasification combustion equipment will be now described.

In recent dry distillation gasification combustion equipments, the key problems are how to stably produce clean combustible gas from a solid fuel in the dry distillation gas generator and how to burn the combustible gas in the combustion gas burner unit. However, there is the problem that while there may be only employed a double combustion system to merely primarily burn a solid fuel within a dry distillation gas generator to generate dry distillation gas to secondarily burn it at the combustion unit to thereby burn it with an efficiency as high as possible, such a system cannot cope with the recent environmental problem such as soot and smoke or dust, or odor, etc.

The inventor of this application contemplates a dry distillation gas generator for generating dry distillation gas and a combustion gas burner unit for completely burn gasified fuel which are completely partitioned or divided, thus to improve respective functions thereof as far as possible. Especially, the inventor has drawn attention to the fact that, in order to completely burn a solid fuel completely enough to prevent the production of soot, smoke or odor, etc., the dry distillation gas must as clean as possible, and that a predetermined quantity of the dry distillation gas is produced in a stable state at all times. With the above in view, the inventor has advantageously adopted a scheme to first improve the portions of the dry distillation gas generator and the air supply means, and to provide an impurity separation tank in the middle of a gas conduit connecting the dry distillation gas generator and the combustion gas burner unit to improve cleanness of dry distillation gas delivered into the combustion gas burner unit.

In accordance with a first embodiment of the invention for which patent is sought to be granted, there is prepared, as a dry distillation gas generator, a dry distillation gas generator characterized in that an air chamber and an air blow-off section communicating with the air chamber are disposed at the bottom portion of a tank furnace or combustion chamber having a fuel throw-in portion adapted so that it is opened and closed and a dry distillation gas outlet, wherein the air blowoff section is comprised of an air vent recessed portion bored at a suitable portion of the bottom surface, an air duct allowing the air chamber provided at the central portion of the air vent recessed portion and the interior of the tank furnace to communicate with each other, and an air dispersion cap fitted into an opening portion in the tank furnace of the air duct, the upper surface of the air dispersion cap being caused to be a portion of the bottom surface of the tank furnace, a blowoff hole being formed at the circumferential side of the air dispersion cap so that an air from the air duct is supplied on a decelerated and dispersed state substantially uniformly into the tank furnace from the circumferential side blowoff hole of the air dispersion cap toward the lateral direction, the supplied air being allowed to softly and evenly spread over the entire bottom surface along the air vent recessed portion around the air dispersion cap.

Then, there is prepared, as a combustion gas burner unit, a combustion gas burner unit characterized in that a cylindrical burner body is formed by a refractory material such as ceramic, etc., a gas conduit portion being wormed at the bottom end portion of the burner body, a combustion chamber being formed at the front end thereof, a preheat burner unit for igniting a pilot being provided at a position close to the bottom end side of the burner body, an air storage layer being provided at the outer circumferential surface of the intermediate portion of the burner body, a first air supply section opened at an angle rotated in a spiral form from the outside being provided at the side wall of the burner body, a second air supply section opened at an angle rotated in a spiral form from the air supply layer being provided at the portion slightly closer to the front end side, an air supplied blown off and supplied from the opening of the first air supply unit being caused to be agitated and mixed with combustion gas within the burner body, an air preheated at the air storage layer being supplied from the second air supply section so that it can be agitated and mixed with combustion gas in the vicinity of the combustion chamber.

In addition, a gas conduit is connected to a dry distillation gas outlet of the dry distillation gas generator to provide an impurity separation tank in the middle of the gas conduit to connect the combustion gas burner unit to the front end portion of the gas conduit. A dry distillation gasification combustion equipment thus featured is provided.

In accordance with a second embodiment of the invention for which patent is sought to be granted, a dry distillation gas generator featured below is first prepared. Namely, a tank furnace having a fuel throw-in portion adapted so that it can be opened and closed and a dry distillation gas outlet is provided with a cooling layer at the entire outer circumferential surface of the tank furnace. The bottom portion of the tank furnace is a triple layer structure having a bottom surface made up by a heat resisting maternal, a cooling layer, and an air chamber. A cleaning port at the side of the air chamber. In addition, a plurality of air blowoff portions are disposed at the bottom of the tank furnace. The air blowoff portion includes an air vent recessed portion bored at a suitable portion of the bottom surface, an air duct allowing the air chamber at the central portion of the air vent recessed portion and the interior of the tank furnace to communicate with each other, and an air dispersion cap fitted into the opening in the tank furnace of the air duct. The upper surface of the air dispersion cap is a portion of the bottom surface of the tank furnace, air blown off from the air ducts is in a decelerated and dispersed state substantially uniformly into the tank furnace from blowoff holes on the circumferential of the air dispersion caps toward the lateral direction, the supplied air being allowed to softly and evenly spread over the entire bottom surface along the air vent recessed portion around the air dispersion cap.

The combustion gas burner unit includes a combustion gas burner unit having a cylindrical burner body formed of refractory material such as ceramic, etc., a gas conduit section at the bottom end portion of the burner body, a combustion chamber at the front end thereof, a preheat burner section for igniting a pilot at a position close to the bottom end side of the burner body, an air storage layer at the outer circumferential surface of the intermediate portion of the burner body, a first air supply section opened at an angle rotated in a spiral form from the outside at the side wall of the burner body, a second air supply section opened at an angle rotated in a spiral form from the air supply layer at the portion slightly closer to the front end side, air blown off and supplied from the opening of the first air supply section is agitated and mixed with combustion gas within the burner body, air preheated at the air storage layer is supplied from the second air supply unit so that it is agitated and mixed with combustion gas in the vicinity of the combustion chamber.

In addition, a gas conduit is connected to a dry gas outlet of the dry distillation gas generator to provide an impurity separation tank in the middle of the gas conduit which connects the combustion gas burner unit to the front end portion of the gas conduit.

In accordance with a third embodiment of the invention for which patent is sought to be granted, there is provided a dry distillation gas generator in which an air chamber and an air blow-off section communicating with the air chamber are disposed at the bottom portion of a tank furnace or combustion chamber having a fuel throw-in portion adapted so that it can be opened and closed and a dry distillation gas outlet, wherein the air blowoff portion is comprised of an air vent recessed portion bored at a suitable portion of the bottom surface, an air duct allowing the air chamber provided at the central portion of the air vent recessed portion and the interior of the tank furnace to communicate with each other, and an air dispersion cap fitted into an opening in the tank furnace of the air duct, the upper surface of the air dispersion cap is a portion of the bottom surface of the tank furnace, a blowoff opening or hole being formed at the circumferential side of the air dispersion cap so that air from the air duct is supplied in a decelerated and dispersed state substantially uniformly into the tank furnace from the circumferential side blowoff hole of the air dispersion cap toward the lateral direction, the supplied air being allowed to softly and evenly spread over the entire bottom surface along the air vent recessed portion around the air dispersion cap.

In accordance with a fourth embodiment of the invention for which patent is sought to be granted, a dry distillation gas generator includes a tank furnace having a fuel throw-in portion adapted so that it can be opened and closed and a dry distillation gas outlet includes a cooling layer at the entire outer circumferential surface of the tank furnace. The bottom portion of the tank furnace is of a triple layer structure with a bottom surface made up by a heat resisting material, a cooling layer, and an air chamber. A cleaning port is located at the side of the air chamber. In addition, a plurality of air blowoff portions are disposed at the bottom of the tank furnace. The air blowoff section includes an air vent recessed section bored in the bottom surface, an air duct allowing the air chamber at the central portion of the air vent recessed portion and the interior of the tank furnace to communicate with each other, and an air dispersion cap fitted into an opening in the tank furnace of the air duct. The upper surface of the air dispersion cap fitted into the opening in the tank furnace is a portion of the bottom surface of the tank furnace, an air blown off from the air duct being supplied in a decelerated and dispersed state substantially uniformly into the tank furnace from the circumferential side blowoff opening formed on the circumferential side of the air dispersion cap toward the lateral direction, the supplied air being allowed to softly and evenly spread over the entire bottom surface along the air vent recessed portion around the air dispersion cap.

In accordance with a fifth embodiment of the invention for which patent is sought to be granted, there is provided a combustion gas burner unit which includes a cylindrical burner body of refractory material such as ceramic, etc., a gas conduit portion at the bottom of the burner body, a combustion chamber at the front end thereof, a preheat burner section for igniting a pilot at a position close to the bottom end side of the burner body, an air storage layer at the outer circumferential surface of the intermediate portion of the burner body, a first air supply section opened at an angle rotated in a spiral form from the outside at the side wall of the burner body, a second air supply section opened at an angle rotated in a spiral form from the air supply layer at the portion slightly closer to the front end side, air supplied blown off and supplied from the opening of the first air supply unit being agitated and mixed with combustion gas within the burner body, air preheated at the air storage layer being supplied from the second air supply portion so that it can be agitated and mixed with combustion gas in the vicinity of the combustion chamber.

Since the first invention for which patent is sought to be granted is constructed as above, when a solid fuel such as a tire, etc. is admitted from the fuel throw in portion into the tank furnace to blow an air into the air chamber at the bottom portion thereof, a predetermined quantity of air is supplied into the dry distillation gas generator through the air blowoff section communicating with the air chamber. At this time, since the air blowoff section is comprised of the air vent recessed portion bored at a suitable portion of the bottom surface of the tank furnace, the air duct allowing the air chamber provided at the central portion of the air vent recessed portion and the interior of the tank furnace to communicate with each other, and the air dispersion cap fitted into the opening in the tank furnace of the air duct, and the blowoff hole is formed at the circumferential side of the air dispersion cap, air blown from the air duct is supplied in a decelerated and dispersed fashion substantially uniformly into the tank furnace from the circumferential side blowoff hole of the air dispersion cap toward the lateral direction, and the supplied air softly and evenly spreads over the entire bottom surface along the air vent recessed portion around the air dispersion cap.

When the accommodated solid fuel such as a tire, etc. is ignited, only the portion of the solid fuel in the vicinity of the bottom portion of the tank furnace where air spreads is burned.

At that time, the upper surface of the air dispersion cap serves as a portion of the bottom surface of the tank furnace such that there is no projecting portion. Thus, accommodation of the solid fuel is easy.

Further, since the air dispersion cap is such that the blowoff hole or opening is formed on the circumferential side thereof, and that the air vent recessed portion is formed therearound, there is no possibility that the air blowoff opening is inadvertently clogged by the solid fuel. In addition, since a blowing force of air is used for spreading toward the lateral direction through the air vent recessed section, and air which has lost its blowing force is dispersed and supplied softly in an upward direction, there results a state in which air spreads softly and evenly at all times.

As a result, the combustion area of the solid fuel is limited to the portion in the vicinity of the bottom where air is stably supplied, but does not spread over other portions. Such stabilized partial combustion in the vicinity of the bottom portion heats the solid fuel about it so that thermal decomposition is produced. Thus, dry distillation gas is efficiently and stably generated. Since the air is softly diffused and supplied at all times, there is no possibility that carbon is picked up to float in the air within the tank furnace, thus permitting the dry distillation gas produced to be a clean gas having less impurities.

By employing the dry distillation gas generator as stated above, the dry distillation gasification combustion equipment of this application efficiently and stably generates a dry distillation gas having less impurities resulting in a cleaner dry distillation gas by making use of the impurity separation tank provided in the middle of the gas conduit to introduce it into the combustion gas burner unit.

The clean dry distillation gas introduced from the gas conduit of the burner body is agitated and mixed with, while rotating, the air blown off and delivered from the opening of the first air supply section within the cylindrical burner body heated in advance by the preheat burner section, and is introduced in a direction of the combustion chamber at the front end thereof. The dry distillation air thus introduced is ignited by a pilot of the preheating burner unit, and is guided in a direction of the combustion chamber at the front end portion. The dry distillation gas thus introduced is ignited by a pilot of the preheat burner section, so it is burned while blowing out flame from the combustion chamber. In this instance, in the vicinity of the combustion chamber, the air preheated by the air storage layer is further delivered from the second air supply portion, and is agitated and mixed with combustion gas, thus further assisting combustion.

By employing such a configuration, a clean dry distillation gas is completely burned at the combustion gas burner unit.

The configuration of the air blowoff section of the second invention for which patent is sought to be granted is the same as that of the first invention, and effects/advantages are the same as those of the first invention. Accordingly, their explanation is omitted here. The feature of the second invention except for the above resides in that the cooling layer is provided at the entire outer circumference of the tank furnace, that its bottom portion is of a triple layer structure with the bottom surface made up of a heat resisting material, cooling layer and air chamber, and that a cleaning port in the air chamber is provided at the side portion of the air chamber. The configuration thus featured provides the following effect.

First, the presence of the cooling layer on the entire outer circumference of the tank furnace suppresses temperature elevation within the tank furnace to prevent extra or unnecessary combustion except for portions in the vicinity of the bottom portion of the solid fuel, thus reducing soot and smoke or dust and floating particulates as much as possible.

Since the bottom portion is a triple layer structure, the high temperature portion on the surface of the bottom has sufficient durability. Further the cooling layer prevents the temperature of the bottom portion of the tank furnace from rising higher than is required. The large air chamber permits an even supply of air over the entire bottom portion. The supplied air is pre-heated.

In addition, the cleaning port at the side of the air chamber permits easy cleaning of accumulated residual impurities that may have dropped through the air duct.

By using the dry distillation gas generator as stated above, the dry distillation gasification combustion equipment of this invention efficiently and stably generates dry distillation gas including less impurities to allow it to serve as a cleaner dry distillation gas. This cleanliness is further improved by the impurity separation tank in the middle of the gas conduit. The dry distillation gas generated by the dry distillation gas generator of this invention has a cleanness higher than that of the first invention.

The dry distillation gas is sufficiently clean to be completely burned in the combustion gas burner unit. Since the effect within the combustion gas burner unit is the same as that within the combustion gas burner unit described in the first invention, its explanation is omitted here.

Since the effect of the dry distillation gas generator of the third invention for which patent is sought to be granted is the same as that of the dry distillation gas generator of the first invention, and the effect of the dry distillation gas generator of the fourth invention is the same as that of the first invention, their explanation is omitted here.

In addition, the effect within the combustion gas burner unit of the fifth invention is also the same as that of the first invention, its explanation is omitted here.

Briefly stated, the present invention provides a dry distillation gas generator which generates a dry distillation gas for burning in a separate combustion gas burner unit. Air is supplied in a gentle decelerated flow to the bottom of the dry distillation gas generator in a quantity sufficient to support combustion of a solid fuel in the vicinity of the air supply, but at a low enough volume to prevent the combustion proceeding to other parts of the gas generator, thus thermally decomposing the remainder of the solid fuel to generate the dry distillate gas. An air chamber surrounds the gas generator to reduce the temperature to which the solid fuel is exposed. Similarly, an air chamber is disposed below the bottom of the gas generator to supply air to the gas generator, and to moderate the temperature therein. An impurity separation tank in a conduit between the gas generator and the gas burner unit helps prevent particulates from entering the gas generator. A preheat burner in the combustion gas burner unit includes a pilot to ignite and preheat the gas. A first air injection device injects air from outside the gas burner in a spiral flow to agitate and mix the gas with air. A second air injection device injects air preheated in an air storage layer surrounding the gas burner unit into the gas burner in a spiral flow to further agitate and mix the gas with air. The injection point of the second air injection device is downstream of the injection point of the first air injection device.

According to an embodiment of the invention, there is provided a dry distillation gasification combustion equipment comprising: a dry distillation gas generator, the dry distillation gas generator including a tank furnace, an air chamber in a bottom of the tank furnace, an air blowoff section communicating from the air chamber to a bottom portion of the tank furnace, the air blowoff section including an air vent recessed portion bored in a bottom surface of the tank furnace, an air duct allowing for permitting air from the air chamber to pass to a center of the air vent recessed portion, an air dispersion cap fitted into an opening of the air duct, an upper surface of the air dispersion cap forming a portion of a bottom surface of the tank furnace, a blowoff opening about a circumference of the air dispersion cap, the blowoff opening supplying air from the air duct in a decelerated and dispersed state substantially uniformly into the tank furnace from the circumference of the blowoff opening, the air softly and evenly spreading over the entire bottom surface of the tank furnace, a fuel door in the tank furnace, effective for permitting entry of a dry fuel into the tank furnace, the fuel door being openable and closeable, a dry distillation gas outlet from the tank furnace, a combustion gas burner unit, a gas conduit conducting dry distillation gas from the dry distillation gas outlet to the combustion gas burner unit, the combustion gas burner unit including a burner body, a combustion chamber in the combustion gas burner unit receiving gas from the gas conduit, the combustion chamber including a preheat burner section for igniting a pilot at a position close to an upstream end of the combustion chamber, an air storage layer surrounding an outer circumferential surface of an intermediate portion of the combustion chamber, a first air supply section skewed an angle for injecting air rotating in a spiral from the outside through a side wall of the combustion chamber, a second air supply section skewed at an angle for injecting air in a spiral from the air storage layer through the side wall, the air injected by the second air supply section being preheated in the air storage layer and injected in the combustion chamber at a position downstream of the injection of air by the first air supply section, and an impurity separation tank in the gas conduit at a position intermediate the tank furnace and the combustion gas burner unit for separating impurities from the dry distillation gas before applying it to the combustion gas burner unit.

According to a feature of the invention, there is provided a dry distillation gasification combustion equipment comprising: a tank furnace, means for entering a solid fuel in the tank furnace, a cooling layer about a substantial portion of the tank furnance, a bottom of the tank furnance including a triple layer structure including first, second and third layers, the first layer including a heat resisting material, the second layer including a cooling layer, the third layer including an air chamber, a plurality of air blowoff portions in the bottom, each of the air blowoff portions an air vent recessed portion bored in the first layer and an air duct communicating air from the air chamber to the air vent recessed portion, an air dispersion cap fitted into each air duct, an upper surface of each air dispersion cap forming a portion of the first layer, means for permitting air to pass the air dispersion cap substantially uniformly in a decelerated and dispersed state in a lateral direction into the tank furnace from a blowoff opening on a circumference of each air dispersion cap toward the lateral direction, the supplied air softly and evenly spreading over the entire bottom surface along the air vent recessed portion around the air dispersion cap, a combustion gas burner unit, the combustion gas burner unit including a burner body, a gas conduit section connecting dry distillate fuel gas from the tank furnace to the combustion gas burner, the burner body including a combustion chamber, a preheat burner section at an upstream end of the combustion chamber, a pilot in the preheat burner for igniting the dry distillate gas, an air storage layer surrounding a substantial circumferential portion of the, a first air supply section opening from the outside through a side wall of the burner body at an angle rotated in a spiral, a second air supply section opening from the air supply layer through the side wall at an angle rotated in a spiral, the first air supply section entering the burner body at a position upstream of a position where the second air supply section enters the burner body, air in the air supply layer being preheated before being injected into the burner body, and an impurity separation tank at an intermediate position in the gas conduit for removing impurities from the dry distillation gas.

According to a further feature of the invention, there is provided a dry distillation gas generator comprising: a tank furnace, a combustion chamber in the tank furnace, means for entering a fuel into the combustion chamber, a dry distillation gas outlet from the combustion chamber, an air chamber below a bottom of the combustion chamber, an air blow-off section communicating air from the air chamber to a bottom portion of the tank furnace, the air blowoff section including at least one air vent recessed portion bored in a bottom surface of the combustion chamber, an air duct communicating air from the air chamber to the at least one air vent recessed portion, an air dispersion cap fitted into the air duct, an upper surface of the air dispersion cap forming a portion of the bottom surface, a blowoff opening about a circumference of the air dispersion cap, the blowoff opening supplying air radially therefrom substantially uniformly in a decelerated and dispersed state into the tank furnace, the supplied air softly and evenly spreading over the bottom surface.

According to a still further feature of the invention, there is provided a dry distillation gas generator comprising: a tank surface, a fuel door in the tank furnace adapted to being opened and closed, a dry distillation gas outlet from the tank furnance, a cooling layer surrounding a substantial portion of an outer circumferential surface of the tank furnace, a bottom portion of the tank furnace including first, second and third layers, the first layer being a heat resisting material, the second layer being a cooling layer below the first layer, the third layer being an air chamber below the cooling layer, a plurality of air blowoff portions in the bottom portion, each air blowoff portion including an air vent recessed portion bored in the first layer, an air duct communicating air from the air chamber to the air vent recessed portion, an air dispersion cap being fitted into the air duct, an upper surface of the air dispersion cap forming a portion of the a bottom surface of the tank furnace, means for permitting air entering the tank furnace to be supplied radially from the air dispersion cap and to enter the tank furnace substantially uniformly in a decelerated and dispersed state and to softly and evenly spread over the entire bottom surface along the air vent recessed portion around the air dispersion cap.

According to a still further feature of the invention, there is provided a combustion gas burner unit comprising: a burner body, a gas conduit portion at an end if the burner body, a combustion chamber in the burner body, a preheat burner section for igniting a pilot at an upstream end of the combustion chamber, an air storage layer surrounding a substantial portion of a circumference of the combustion chamber, a first air supply section from outside to an interior of the combustion chamber, skewed at a first angle for rotating injected air in a spiral, a second air supply section from the air storage layer to the interior, skewed at a second angle for rotating air injected air in a spiral, an injection point of the first air supply section being upstream of an injection point of the second air supply section, air injected through the second air supply section being preheated in the air storage layer, and the first and second angles being effective for agitating and mixing the dry distillate fuel gas with air from the first and second air supply sections.

According to a still further feature of the invention, there is provided a dry distillate gas generator comprising: a tank furnace, means for loading a solid fuel in the tank furnace, a bottom in the tank furnace, an air chamber below the bottom, an air duct connecting the air chamber through the bottom, an air dispersion cap in a top of the air duct, a tapered lower surface on the air dispersion cap, at least one projection on the tapered lower surface, the at least one projection being effective for maintaining the tapered lower surface out of contact with the air duct, whereby at least one blow-off hole is maintained between the tapered lower surface and the air duct, and the blow-off hole being inclined to enter air above the bottom generally radially, and in a slow, gentle flow.

According to yet another feature of the invention, there is provided a dry distillate gas generator and a combustion apparatus comprising: a tank furnace, sealable means for adding a solid fuel to the tank furnace, means for flowing air into a bottom of the tank furnace in a generally radial flow across the bottom, in a flow effective to combust no more than a portion of the solid fuel, and to thermally decompose a remainder of the solid fuel to produce a dry distillate gas, a combustion chamber, a gas conduit connecting the dry distillate gas from the tank furnace to the combustion chamber, an impurity separation tank in the gas conduit, an air storage layer surrounding the combustion chamber, a preheat burner in an upstream end of the combustion chamber, means for injecting a first supply of air from outside the combustion chamber into the combustion chamber downstream of the preheat burner, means for injecting a second supply of air from the air storage layer into the combustion chamber downsteam of an injection point of first supply of air, and the first means for injecting and the second means for injecting including means for spiraling air injected into the combustion chamber whereby agitation and mixing of air with the dry distillate gas is enabled.

According to another feature of the invention, there is provided a combustion apparatus for burning a fuel gas comprising: a combustion chamber, an air storage layer surrounding the combustion chamber, the air storage layer receiving heat from the combustion chamber to preheat air therein, means for flowing the fuel gas through the combustion chamber, first means for injecting a first supply of air from outside the combustion chamber into the combustion chamber, second means for injecting a second supply of preheated air from the air storage layer into the combustion chamber, air injected by the second means being injected downstream of a location at which air is injected by the first means, and the first means and the second means both including means for producing a spiral flow of air in the combustion chamber, whereby agitation and mixing of the fuel gas with the air is enabled.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
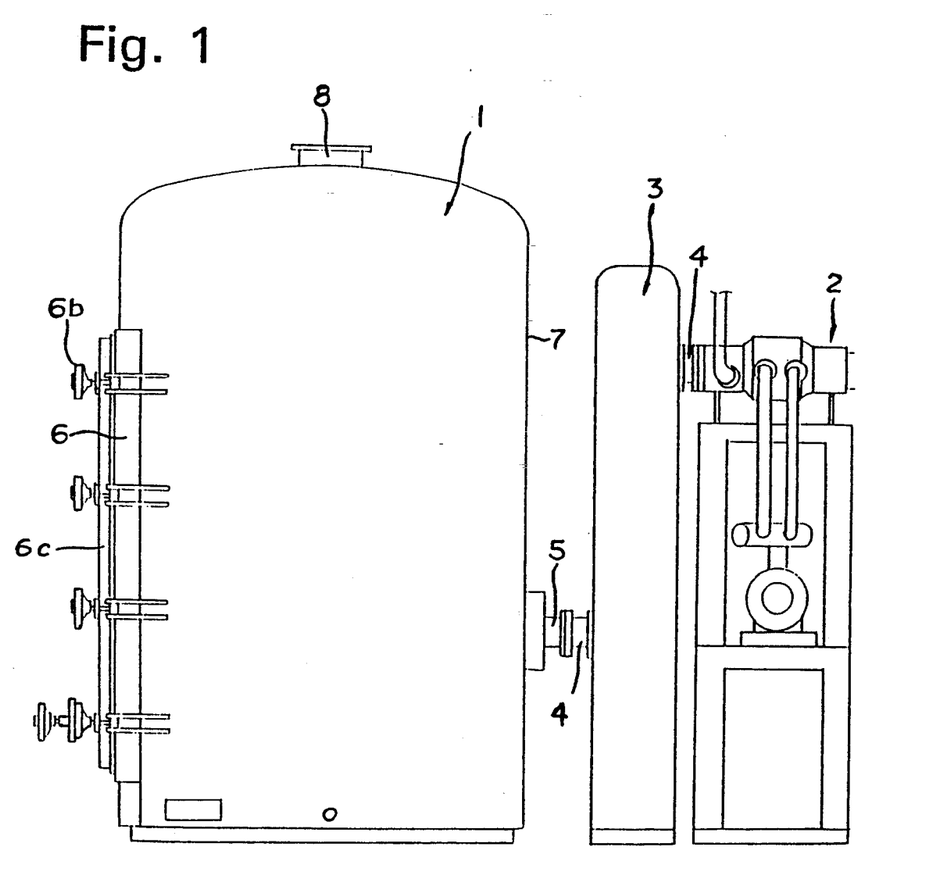
FIG. 1 is a side view showing a dry distillation gasification combustion equipment.
Figure 2:
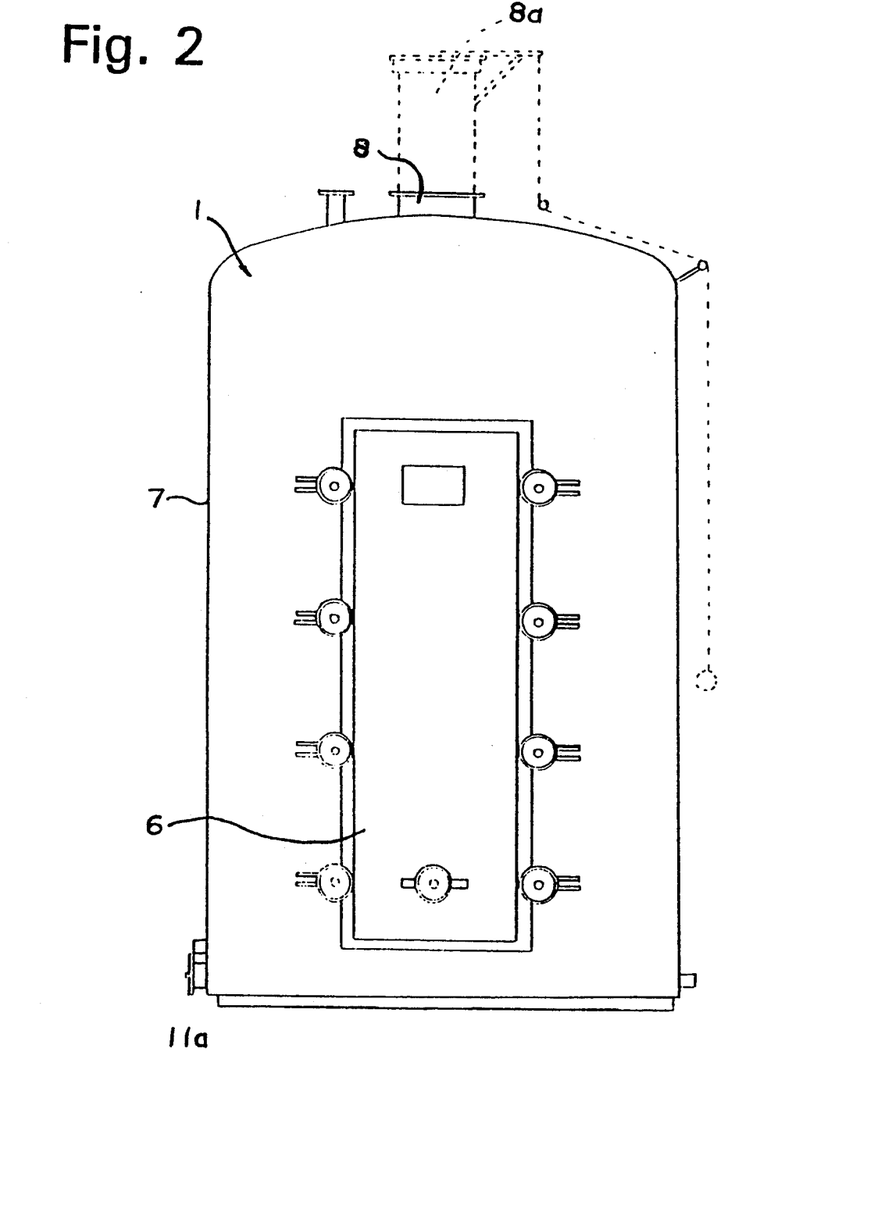
FIG. 2 is a front view showing a dry distillation gas generator.

Referring to FIGS. 1 and 2, the dry distillation gasification combustion equipment of the present invention includes a dry distillation gas generator 1 and a combustion gas burner unit are separate units connected together through a gas conduit 4. An impurity separation tank 3 is positioned in the middle portion of gas conduit 4.

The dry distillation gasification combustion equipment of the embodiment shown is especially adaptable for burning used tires and for generating dry distillation gas therefrom to completely burn used tires, thus providing thermal energy. In accordance with this equipment, the gas conduit 4 is connected to a dry distillation gas outlet 5 at the rear of dry distillation gas generator 1. A combustion gas burner unit 2 is connected to the end of the gas conduit 4.

Dry distillation gas generator 1 includes a tank furnace 7 made of carbon steel, having a fuel throw-in portion 6, or feed door, adapted so that it can be opened and closed to receive solid fuel. Dry distillation gas outlet 5 is connected to tank furnace 7.

A safety valve 8 at the top of the tank furnace 7 permits the discharge of excessive pressure from tank furnace 7 in the event of a malfunction. A further safety valve 8a, shown in dashed line in FIG. 2, may be provided according to need.

Figure 3:
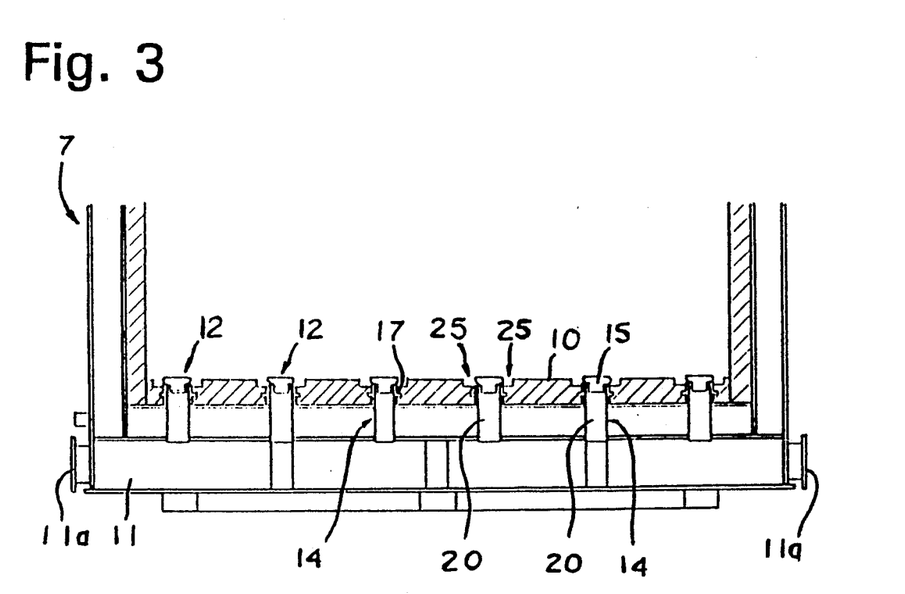
FIG. 3 is a longitudinal cross sectional side elevation showing the structure of the bottom portion within the tank furnace.
Figure 4:
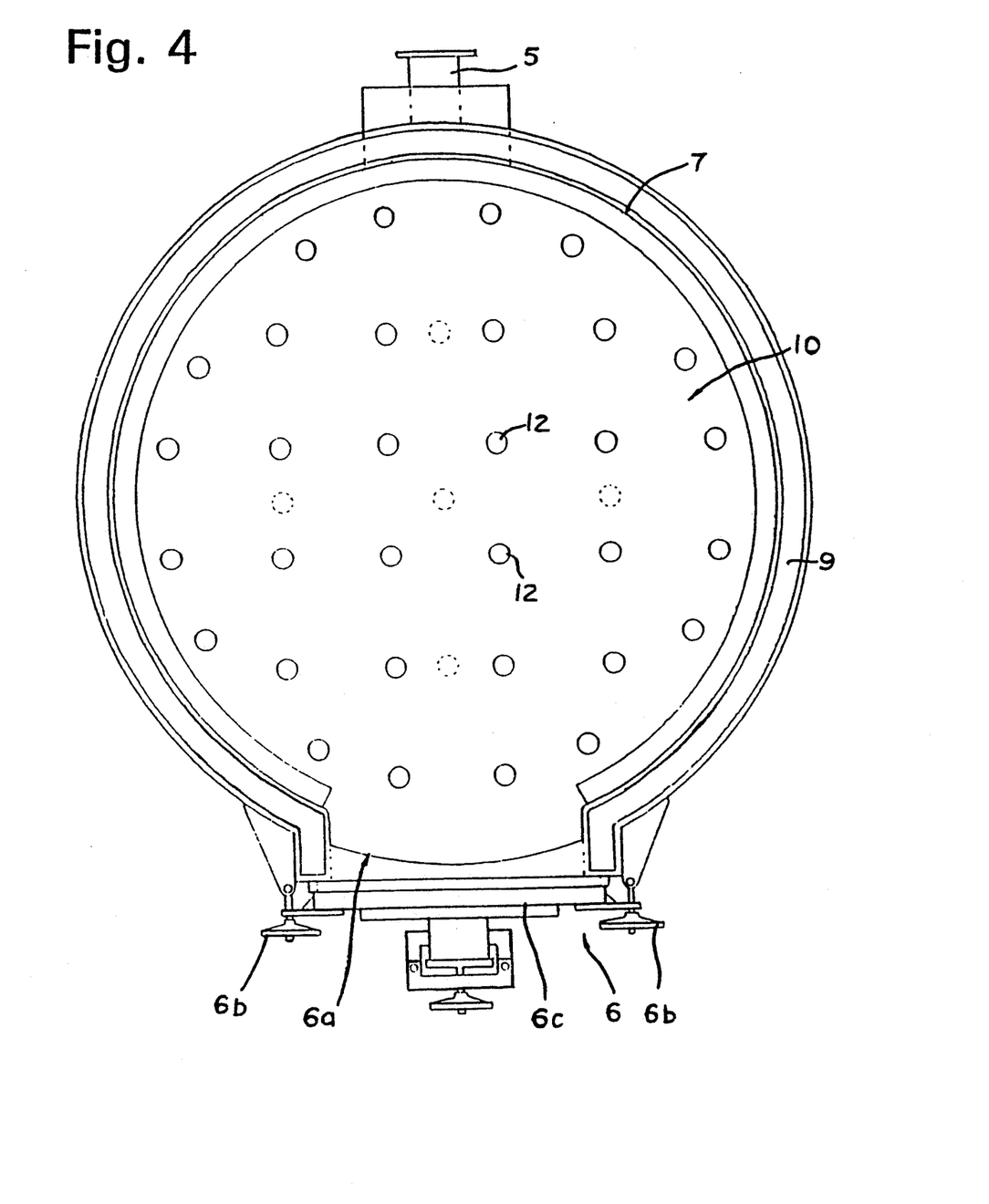
FIG. 4 is a plan view showing the structure of the bottom portion shown in FIG. 3.

Referring now to FIGS. 3 and 4, fuel throw-in portion 6 includes a tank door 6c that can be opened and closed to reveal a large fuel entrance/exit 6a at the front side of the tank furnace 7. Screw-type sealing devices 6b, or clamps, hold tank door 6c sealed over entrance/exit 6a to prevent the loss of fuel gas therethrough. The large size of fuel entrance/exit 6a eases feeding a stack of solid fuel into the tank furnace 7, and removing residual material after combustion. The large size of fuel entrance/exit 6a also simplifies cleaning the interior of tank furnace 7.

Although the embodiment shown employs a single dry distillation gas outlet 5 in the rear of tank furnace 7, one skilled in the art will recognize that additional dry distillation gas outlets (not shown) may be added about the circumference of tank furnace 7 without departing from the spirit and scope of the invention. If a plurality of dry distillation gas outlet are included, a single one may be chosen as required by piping requirements, or, alternatively, two or more dry distillation gas outlets may be employed simultaneously to convey the dry distillation gas from tank furnace 7.

A cooling layer 9 encircles the entire circumference of the tank furnace 7. Cooling water is circulated in cooling layer 9 to control the temperature of the outside wall of tank furnace 7.

Cooling layer 9 extends behind the packing of tank door 6c covering fuel entrance/exit 6a. The portion of cooling layer 9 in this region avoids accelerated heat aging of the packing sealing tank door 6c, thereby enabling long-term use of the equipment.

The bottom portion of the tank furnace 7 is a triple layer structure. The upper part of the triple layer structure is a bottom surface 10 of a heat resisting material such a refractory material. Cooling layer 9 extends under bottom surface 10. An air chamber 11 is located below cooling layer 9. Removable clearing ports 11a at the sides of air chamber 11 permit purging debris therefrom.

The inner circumferential surfaces of the lower portions of the bottom surface 10 and the tank furnace 7 are exposed to combustion heat. Consequently, at least these portions of the interior of tank furnace 7 are lined with a refractory (ceramic) material for its heat-resisting properties.

The cooling layer 9 forms a water jacket system in which a cooling water is contained at the outside of the bottom surface 10, and is adapted to cool the bottom surface 10 subject to high temperature, thus to realize protection thereof and an increased durable life. The air chamber 11 formed outside the cooling layer 9 is in the form of an air chamber formed on the entire surface of the bottom portion, and is of a structure such that blowoff of an air is caused to be uniform, and that a necessary quantity of air can be supplied at any time.

At the bottom portion of the tank furnace 7, a plurality of air blowoff portions 12 distributed substantially uniformly over the area of bottom surface 10.

Referring now to FIGS. 5, 6, 7 and 8, each the air blowoff portions 12 includes an air vent recessed portion 13 recessed in bottom surface 10. An air duct 14 communicates air between air chamber 11 and the center of the air vent recessed portion 13 to permit the flow of air therethrough into the interior of tank furnace 7. An air dispersion cap 15 is fitted the top of each air duct 14.

Figure 5:
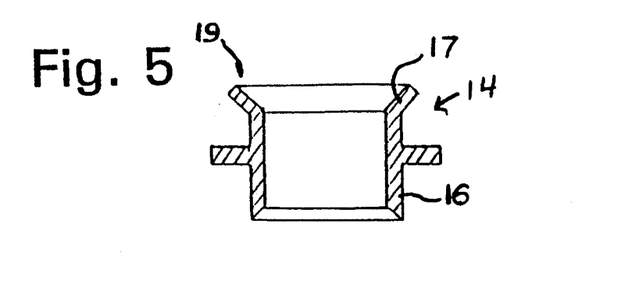
FIG. 5 is a longitudinal cross sectional side elevation showing the configuration of an air duct of the air blow-off portion.

Referring specifically to FIG. 5, air duct 14 includes a fitting member 19 including an air dispersion cap receiving portion 17 at the upper end opening portion of a tubular body 16. An embedded projecting portion 18 projects outward from air duct 14. Embedded projecting portion 18 is embedded in bottom surface 10. A cylindrical body 20 (FIG. 8) extends downward from tubular body 16, through cooling layer 9, and to air chamber 11.

Referring again to FIGS. 6, 7 and 8, air dispersion cap 15 is a heat resisting special casting in the form of an inverse triangular cone, as shown in FIGS. 6 and 7. An upper surface 21 of air dispersion cap 15 is flat. A lower surface of air dispersion cap 15 is a tapered surface 22. A plurality of radial projections 23 extend down tapered surface 22. Centering projections 24 at a lower end of air dispersion cap 15 contact the inner surface of air duct 14 to maintain air dispersion cap 15 centered with respect to air duct 14. The radial projections 23 and the air dispersion cap receiving portion 17 maintain a blowoff channel or hole 25 between the air dispersion cap receiving portion 17 and the tapered surface 22.

Figure 6:
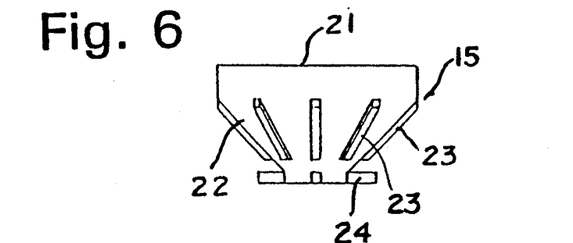
FIG. 6 is a perspective view showing an air dispersion cap.
Figure 7:
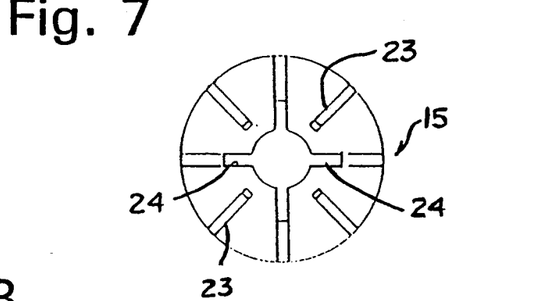
FIG. 7 is a bottom view showing an air dispersion cap.
Figure 8:
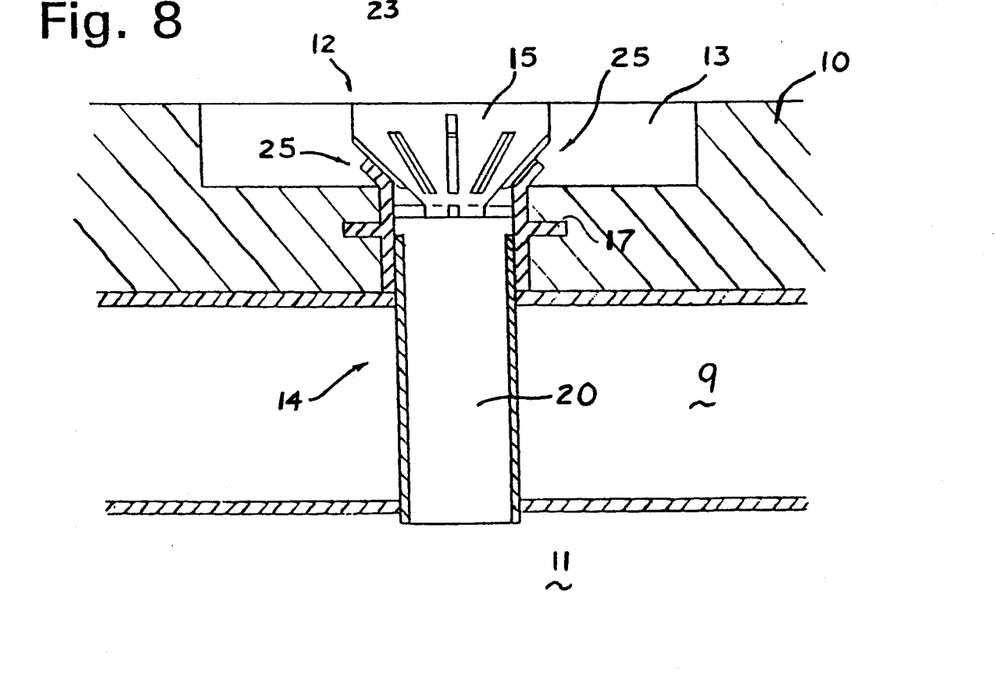
FIG. 8 is a longitudinal cross sectional explanatory view showing the state where the air blowoff portion is attached on the bottom portion.

Upper surface 21 of air dispersion cap 15, fitted into the opening in the tank furnace 7, forms a portion of the bottom surface 10 of tank furnace 7. Air entering from air duct 14 is decelerated and dispersed to enter tank furnace 7 substantially uniformly though outwardly tapering blowoff holes 25 between the side of air dispersion cap 15 and air dispersion cap receiving portion 17. The air thus supplied softly and evenly spreads over the entire bottom surface 10 along the air vent recessed portion 13 around the air dispersion cap 15.

As described above, in accordance with this invention, air blowoff portions 12 are made up of the air duct 14 and the air dispersion cap 15. Air duct 14 is fixed in the bottom of tank furnace 7 and air dispersion cap 15 is removably fixed in air duct 14. This makes it is possible to cope with expansion and distortion due to heat over a long period of use. Further, air dispersion cap 15 can be removed to simplify cleaning, exchange, and/or maintenance thereof.

It is to be noted that, although not shown, tank furnace 7 includes a temperature sensor for monitoring the temperature of the dry distillation gas produced, a sensor for automatically controlling the quantity of gas produced after the temperature reaches a predetermined temperature (150° to 200° C.), and an electromagnetic valve for allowing a air to be completely sealed off when the power supply is interrupted either intentionally or due to primary power interruption. Such sensing and control enables complete control of the process of dry distillation of solid fuel.

Figure 9:
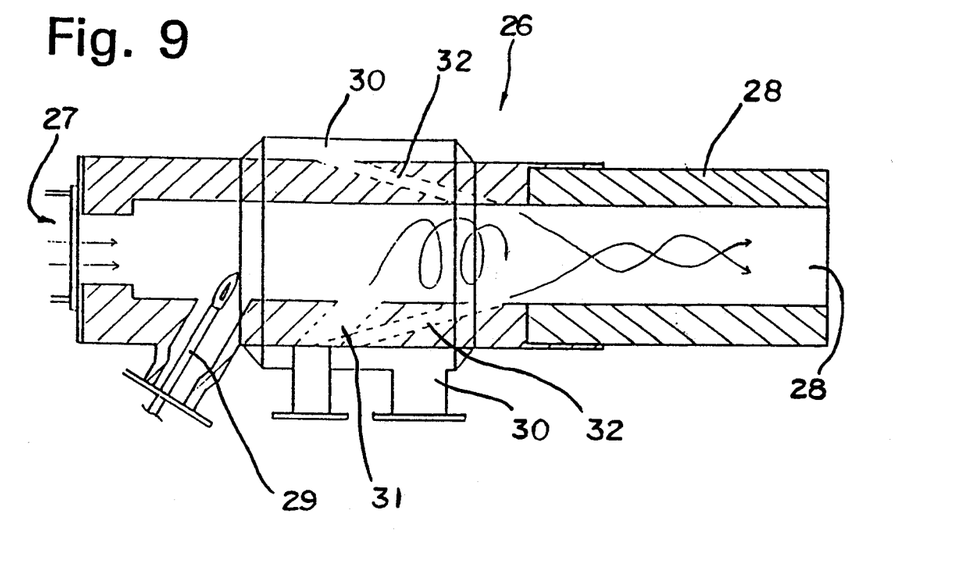
FIG. 9 is a longitudinal cross sectional plan view of a combustion gas burner unit.
Figure 10:
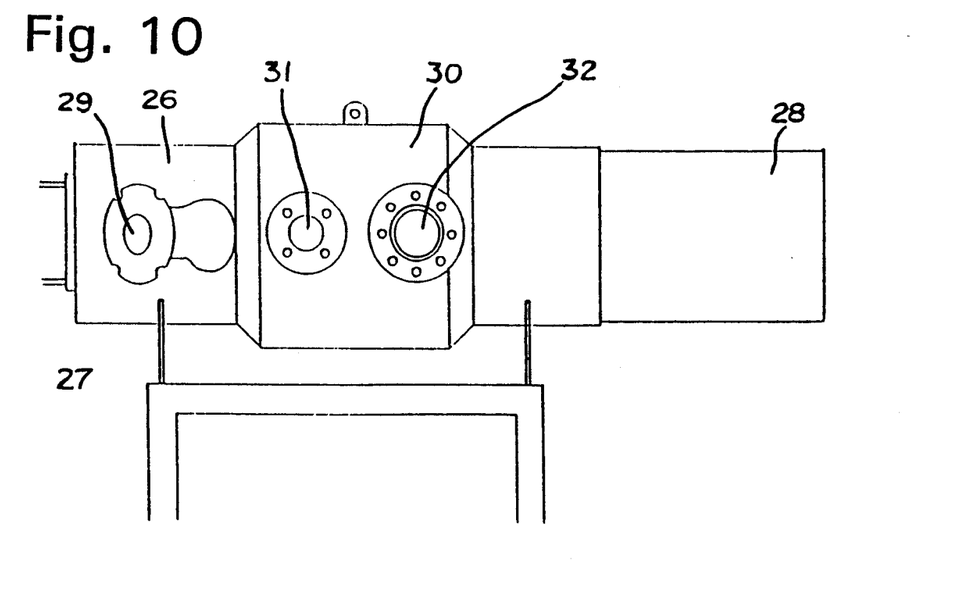
FIG. 10 is a side view of the combustion gas burner unit.

Referring now to FIGS. 9 and 10, combustion gas burner unit 2 includes a cylindrical burner body 26, of a refractory material such as, for example, a ceramic. A gas conduit portion 27 at the upstream end of burner body 26 admits dry distillate gas from tank furnace 7. A combustion chamber 28 at the downstream end of burner body 26. A preheat burner unit 29 for igniting a pilot flame is positioned in the bottom of burner body 26, near its upstream end. An air storage layer 30 encircles the outer circumference of an intermediate portion of burner body 26.

It is to be noted that, although combustion chamber 28 is shown as a removable structure, one skilled in the art will recognize that it may be integrally formed with burner body 26 without departing from the spirit and scope of the invention.

A first air supply section 31 opens through the wall of burner body 26 at a forward angle and a skew angle with respect to the longitudinal axis of burner body 26 to apply a forward velocity component and a rotating velocity component to the injected air to cause the injected air to rotate in a forward-moving spiral within burner body 26. A pair of second air supply sections 32 and 32 pass from air supply layer 30 to enter burner body 26 at a position downstream of the entry of air supply section 31, and at a shallower forward angle to produce a higher component of air velocity along the axis of burner body 26. Second air supply sections 32 and 32 are also skewed with respect to the longitudinal axis of burner body 26 to impart spiral rotation to the injected air. The resulting along-axis and spiral motions of the injected air is illustrated by spiral lines in FIG. 9.

The spiral rotation imparted to the air by the skewed positioning of first air supply section 31 and second air supply sections 32 and 32, tend to mix the fuel gas passing through burner body 26 with the injected air.

Air storage layer 30 is preheated by heat conduction from the combustion within burner body 26. As a consequence, the air from second air supply sections 32 and 32 is injected at an elevated temperature to improve combustion at the relatively downstream location of injection.

According to the foregoing, the present invention provides a dry distillation gasification combustion equipment in which a dry distillation gas generator, a combustion gas burner unit, and an impurity separation tank are connected together by a gas conduit. An air blowoff section includes an air vent recessed portion bored in the bottom surface of a tank furnace. An air duct feeds air through an air chamber in the center of the air vent recessed portion into the interior of the tank furnace. An air dispersion cap located in the air duct where it opens into the tank furnace forms a portion of the bottom surface of the tank furnace. A blowoff opening is formed about the circumference of the air dispersion cap so that air from the air duct enters the tank furnace substantially uniformly in a decelerated and dispersed state in a radial direction. The supplied air thus softly and evenly spreads over the entire bottom surface of the tank furnace. Accordingly, when a solid fuel such as tires is loaded through fuel door into the tank furnace, air is supplied to the tank furnace uniformly, and in a decelerated and dispersed fashion. The slow uniform air flow prevents emission of embers and dust from the tank furnace. Air flow control is suitable to limit the amount of air to that required to generate dry distillate fuel gas from the solid fuel by burning only a portion of the solid fuel.

The dry distillation gas generator of the present invention permits stably supply of a predetermined quantity of air controlled so as to maintain the distillation condition with balanced combustion and heating. For this reason, the combustion area is limited to a portion of the solid fuel near the bottom portion where air is stably supplied. Such stabilized partial combustion in the vicinity of the bottom portion, heats the remainder of the solid fuel in the tank furnace to produce thermal decomposition. Thus, dry distillation gas is efficiently and stably generated.

Since air supplied is softly diffused and supplied at all times, there whirling or floating up of carbon within the tank furnace is avoided, thus making it possible to generate clean combustible gas in a stabilized manner.

The upper surface of the air dispersion cap forms a portion of the bottom surface of the tank furnace. A blowoff opening about the circumference of the air dispersion cap supplies air from the air duct into the tank furnace radially in a uniform, decelerated and dispersed manner.

The present invention provides following advantages. When a solid fuel such as tires is burned and heated, impurities such as tar, carbon, wire, spike tire pin, or sand, etc. are heated together, so that they are melted, are reduced to ashes, or result in residual material. Such residual material cannot easily clog the air blowoff opening in the bottom of the tank furnace. For this reason, the air supply remains stable in use, thus making it possible to stably maintain for a long time the heat/combustion state in which the conditions for dry distillation are satisfied.

Since the air blowoff opening is large, it is easy to clean and remove residual impurities from the dry distillation gas generator by removing the air dispersion cap. This extends the time during which the dry distillation gas generation can operate.

The combustion gas burner unit burns the clean dry distillation gas fed from the tank furnace through a gas conduit. The dry distillation gas is ignited by a pilot burner in a preheat burner section and is then rotated and mixed with air injected through a skewed first air supply section of the burner body to enable further combustion. The first air supply section injects air with a forward component of velocity along the axis of the combustion gas burner. An air supply is preheated in an air storage layer before being injected through a second air supply section into the combustion gas burner unit at a location downstream of the injection by the first air supply section. The second air supply section is skewed to rotate the injected air for agitation and mixing, and is directed in the downstream direction to increase the travel velocity of the burning gas. The second air supply section is less skewed, but its forward angle is greater than the first air supply section. The combination of plentiful air supply and vigorous agitation with preheating in the combustion burner unit provides efficient and complete combustion of the clean dry distillation gas.

The dry distillation gasification combustion equipment of the present invention efficiently and stably generates a dry distillation gas including less impurities. An impurity separation tank in the gas conduit carrying the gas to the combustion gas burner unit traps impurities (dust, embers, ashes, etc.) to deliver clean dry distillation gas to the combustion gas burner unit. This permits the generation of thermal energy without the emission of soot, smoke or dust into the environment. The dry distillation gasification combustion equipment of the invention is combined with a combustion gas burner unit, and an impurity separation tank connected together by a gas conduit.

A cooling layer about the entire outer circumference of the tank furnace lowers the temperature therein to prevent extra or unnecessary combustion except at the portion in the vicinity of the bottom of the solid fuel to reduce the production of soot, smoke or dust to a minimum, thus permitting production of a clear dry distillation gas.

Using a three-layer structure in the bottom of the tank furnace improves the durability of the high temperature portion on the surface of the bottom portion. A cooling layer, through which combustion air passes on its way to the interior of the tank furnace, keeps the temperature of the bottom surface of the tank furnace at a relatively low temperature without permitting the temperature to rise higher than is required. The air passing through the cooling layer is pre-heated to improve the efficiency of the tank furnace.

The sides of the air chamber include cleaning ports to enable the cleaning out of residual impurities that may have dropped through the air duct in the bottom of the tank furnace.

The presence of the impurity separation tank in the middle of the gas conduit cleans the dry distillation gas to permit complete combustion the combustion gas burner unit without the emission of soot, dust or smoke.

Clean dry distillation gas from the gas conduit section of the burner body is ignited by a pilot in a preheat burner section, and is then rotated, agitated and mixed with air from openings of the first and second air supply sections within the cylindrical burner body.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A dry distillation gasification combustion equipment comprising:
   a dry distillation gas generator;
   said dry distillation gas generator including a tank furnace;
   an air chamber in a bottom of said tank furnace;
   an air blowoff section communicating from said the air chamber to a bottom portion of said tank furnace;
   said air blowoff section including an air vent recessed portion bored in a bottom surface of said tank furnace, an air duct allowing for permitting air from said air chamber to pass to a center of said air vent recessed portion;
   an air dispersion cap fitted into an opening of said air duct;
   an upper surface of said air dispersion cap forming a portion of a bottom surface of said tank furnace;
   a blowoff opening about a circumference of said air dispersion cap;
   said blowoff opening supplying air from said air duct in a decelerated and dispersed state substantially uniformly into the tank furnace from said circumference of said blowoff opening;
   said air softly and evenly spreading over the entire bottom surface of said tank furnace;
   a fuel door in said tank furnace, effective for permitting entry of a dry fuel into said tank furnace;
   said fuel door being openable and closeable;
   a dry distillation gas outlet from said tank furnace;
   a combustion gas burner unit;
   a gas conduit conducting dry distillation gas from said dry distillation gas outlet to said combustion gas burner unit;
   said combustion gas burner unit including a burner body;
   a combustion chamber in said combustion gas burner unit receiving gas from said gas conduit;
   said combustion chamber including a preheat burner section for igniting a pilot at a position close to an upstream end of said combustion chamber;
   an air storage layer surrounding an outer circumferential surface of an intermediate portion of said combustion chamber;
   a first air supply section skewed an angle for injecting air rotating in a spiral from the outside through a side wall of said combustion chamber;
   a second air supply section skewed at an angle for injecting air in a spiral from said air storage layer through said side wall;
   said air injected by said second air supply section being preheated in said air storage layer and injected in said combustion chamber at a position downstream of the injection of air by said first air supply section; and
   an impurity separation tank in said gas conduit at a position intermediate said tank furnace and said combustion gas burner unit for separating impurities from said dry distillation gas before applying it to said combustion gas burner unit.

2. A dry distillation gasification combustion equipment comprising:
   a tank furnace;
   means for entering a solid fuel in said tank furnace;
   a cooling layer about a substantial portion of said tank furnace;
   a bottom of said tank furnace including a triple layer structure including first, second and third layers;
   said first layer including a heat resisting material;
   said second layer including a cooling layer;
   said third layer including an air chamber;
   a plurality of air blowoff portions in said bottom;
   each of said air blowoff portions an air vent recessed portion bored in said first layer and an air duct communicating air from said air chamber to said air vent recessed portion;
   an air dispersion cap fitted into each air duct;
   an upper surface of each air dispersion cap forming a portion of said first layer;
   means for permitting air to pass said air dispersion cap substantially uniformly in a decelerated and dispersed state in a lateral direction into the tank furnace from a blowoff opening on a circumference of each air dispersion cap toward the lateral direction, the supplied air softly and evenly spreading over the entire bottom surface along the air vent recessed portion around the air dispersion cap;
   a combustion gas burner unit;
   said combustion gas burner unit including a burner body;
   a gas conduit section connecting dry distillate fuel gas from said tank furnace to said combustion gas burner;
   said burner body including a combustion chamber;
   a preheat burner section at an upstream end of said combustion chamber;
   a pilot in said preheat burner for igniting said dry distillate gas;

an air storage layer surrounding a substantial circumferential portion of said;
a first air supply section opening from the outside through a side wall of said burner body at an angle rotated in a spiral;
a second air supply section opening from said air supply layer through said side wall at an angle rotated in a spiral;
said first air supply section entering said burner body at a position upstream of a position where said second air supply section enters said burner body;
air in said air supply layer being preheated before being injected into said burner body; and
an impurity separation tank at an intermediate position in said gas conduit for removing impurities from said dry distillation gas.

3. Apparatus according to claim 2, wherein said air chamber includes at least one cleaning port.

4. Apparatus according to claim 2, wherein said burner body is cylindrical.

5. Apparatus according to claim 2, wherein said burner body is ceramic.

6. A dry distillation gas generator comprising:
a tank furnace;
a combustion chamber in said tank furnace;
means for entering a fuel into said combustion chamber;
a dry distillation gas outlet from said combustion chamber;
an air chamber below a bottom of said combustion chamber;
an air blow-off section communicating air from said air chamber to a bottom portion of said tank furnace;
said air blowoff section including at least one air vent recessed portion bored in a bottom surface of said combustion chamber;
an air duct communicating air from said air chamber to said at least one air vent recessed portion;
an air dispersion cap fitted into said air duct;
an upper surface of said air dispersion cap forming a portion of said bottom surface;
a blowoff opening about a circumference of said air dispersion cap;
said blowoff opening supplying air radially therefrom substantially uniformly in a decelerated and dispersed state into said tank furnace, the supplied air softly and evenly spreading over said bottom surface.

7. A dry distillation gas generator comprising:
a tank furnace;
a fuel door in said tank furnace adapted to being opened and closed;
a dry distillation gas outlet from said tank furnace;
a cooling layer surrounding a substantial portion of an outer circumferential surface of the tank furnace;
a bottom portion of said tank furnace including first, second and third layers;
said first layer being a heat resisting material;
said second layer being a cooling layer below said first layer;
said third layer being an air chamber below said cooling layer;
a plurality of air blowoff portions in said bottom portion;
each air blowoff portion including an air vent recessed portion bored in said first layer;

an air duct communicating air from said air chamber to said air vent recessed portion;
an air dispersion cap being fitted into said air duct;
an upper surface of said air dispersion cap forming a portion of said a bottom surface of said tank furnace;
means for permitting air entering said tank furnace to be supplied radially from said air dispersion cap and to enter said tank furnace substantially uniformly in a decelerated and dispersed state and to softly and evenly spread over the entire bottom surface along the air vent recessed portion around the air dispersion cap.

8. A combustion gas burner unit comprising:
a burner body having a longitudinal axis;
a gas conduit portion at bottom end portion of said burner body;
a combustion chamber in said burner body;
a preheat burner section for igniting a pilot at a position close to an upstream end of said combustion chamber;
an air storage layer surrounding a substantial portion of a circumference of said combustion chamber;
a first air supply section from outside to an interior of said combustion chamber, skewed at a first angle for rotating injected air in a spiral;
a second air supply section from said air storage layer to said interior, skewed at a second angle for rotating air injected air in a spiral;
said second angle having a shallower forward angle with respect to said longitudinal axis than said first angle, thereby producing a higher component of air velocity along axis of said burner body;
an injection point of said first air supply section being upstream of an injection point of said second air supply section;
air injected through said second air supply section being preheated in said air storage layer; and
said first and second angles being effective for agitating and mixing a dry distillate fuel gas with air from said first and second air supply sections.

9. A dry distillate gas generator comprising:
a tank furnace;
means for loading a solid fuel in said tank furnace;
a bottom in said tank furnace;
an air chamber below said bottom;
an air duct connecting said air chamber through said bottom;
an air dispersion cap in a top of said air duct;
a tapered lower surface on said air dispersion cap;
at least one projection on said tapered lower surface;
said at least one projection being effective for maintaining said tapered lower surface out of contact with said air duct, whereby at least one blow-off hole is maintained between said tapered lower surface and said air duct; and
said blow-off hole being inclined to enter air above said bottom generally radially, and in a slow, gentle flow.

10. Apparatus according to claim 9, further comprising a cooling layer between said bottom and said air chamber.

11. Apparatus according to claim 9, wherein:
an air vent recessed portion in said bottom surrounds said air duct;
said air dispersion cap being fitted into said air vent recessed portion;

an upper surface of said air dispersion cap being flat; and said upper surface being maintained substantially coplanar with said bottom surface of said tank furnace.

12. Apparatus according to claim 9, wherein said air chamber includes at least one cleanout port.

13. A dry distillate gas generator and a combustion apparatus comprising:
   a tank furnace;
   sealable means for adding a solid fuel to said tank furnace;
   means for flowing air into a bottom of said tank furnace in a generally radial flow across said bottom, in a flow effective to combust no more than a portion of said solid fuel, and to thermally decompose a remainder of said solid fuel to produce a dry distillate gas;
   a combustion chamber;
   a gas conduit connecting said dry distillate gas from said tank furnace to said combustion chamber;
   an impurity separation tank in said gas conduit;
   an air storage layer surrounding said combustion chamber;
   a preheat burner in an upstream end of said combustion chamber;
   means for injecting a first supply of air from outside said combustion chamber into said combustion chamber downstream of said preheat burner;
   means for injecting a second supply of air from said air storage layer into said combustion chamber downstream of an injection point of first supply of air; and
   said first means for injecting and said second means for injecting including means for spiraling air injected into said combustion chamber whereby agitation and mixing of air with said dry distillate gas is enabled.

14. A combustion apparatus for burning a fuel gas comprising:
   a combustion chamber;
   an air storage layer surrounding said combustion chamber;
   said air storage layer receiving heat from said combustion chamber to preheat air therein;
   means for flowing said fuel gas through said combustion chamber;
   first means for injecting a first supply of air from outside said combustion chamber into said combustion chamber;
   second means for injecting a second supply of preheated air from said air storage layer into said combustion chamber;
   air injected by said second means being injected downstream of a location at which air is injected by said first means; and
   said first means and said second means both including means for producing a spiral flow of air in said combustion chamber, whereby agitation and mixing of said fuel gas with said air is enabled; and
   said second means including means to produce a higher component of air velocity along a longitudinal axis of a burner body than said first means.

15. Apparatus according to claim 14, further comprising:
   a preheat burner upstream of said location;
   a pilot associated with said preheat burner for igniting said fuel gas entering said combustion chamber.

16. Apparatus according to claim 14, wherein said combustion chamber is cylindrical.

17. Apparatus according to claim 14, wherein said combustion chamber is ceramic.

* * * * *